United States Patent
Fuenzalida Diaz et al.

(10) Patent No.: US 6,297,353 B1
(45) Date of Patent: Oct. 2, 2001

(54) PROCESS FOR OBTAINING UNSAPONIFIABLE COMPOUNDS FROM BLACK-LIQUOR SOAPS, TALL OIL AND THEIR BY-PRODUCTS

(75) Inventors: Miguel Angel Fuenzalida Diaz; Alejandro Markovits Rojas; Roberto Benito Leiva Hinojosa, all of Santiago; Endre Markovits Schersl, Quilpue, all of (CL)

(73) Assignee: Harting, S.A., Santiago (CL)

( * ) Notice: Subject to any disclaimer, the term of this patent is extended or adjusted under 35 U.S.C. 154(b) by 0 days.

(21) Appl. No.: 09/294,303

(22) Filed: Apr. 19, 1999

(30) Foreign Application Priority Data

Apr. 22, 1998 (CL) ........................................... 873/98

(51) Int. Cl.$^7$ .................... C08F 1/00; C08F 1/04
(52) U.S. Cl. ............................. 530/205; 530/230
(58) Field of Search ..................... 530/205, 230

(56) References Cited

U.S. PATENT DOCUMENTS 4,953,607 * 9/1990 Erkki et al. ..................... 159/13.3

FOREIGN PATENT DOCUMENTS 0 952 208 A2 * 10/1999 (EP) .

* cited by examiner

Primary Examiner—Nathan M. Nutter
(74) Attorney, Agent, or Firm—Baker & McKenzie

(57) ABSTRACT

A method for obtaining neutral compounds from black-liquor soaps, tall oil and tall oil by-products is disclosed. The method includes the steps of: (1) dehydrating black liquor soaps, neutralized tall oil, or neutralized tall oil by-products to form a dehydrated current; (2) distilling the dehydrated current in a distillation column; (3) collecting an essentially soap free distillate; and (4) collecting an essentially neutral compound free residue. Also disclosed is a method for obtaining a sterol concentrate from black-liquor soap solutions, neutralized tall oil, or neutralized tall oil by-products. In this method, a distillation operation is repeated until a current of sterols with the desired purity is obtained. The method yields a sterol concentrate with a level of purity over 96%. In another version of the method, a high purity sterol cocentrate is achieved by vacuum fractionation

17 Claims, 1 Drawing Sheet

PROCESS FOR OBTAINING UNSAPONIFIABLE COMPOUNDS FROM BLACK-LIQUOR SOAPS, TALL OIL AND THEIR BY-PRODUCTS

BACKGROUND OF THE INVENTION

1. Field of the Invention

The present invention relates to a high efficiency process for the obtaining of neutral compounds from black-liquor soaps or crude tall oil (CTO) or any fraction obtained from distillation of crude tall oil that can be used as raw material for the elaboration of pharmaceutical or alimentary products.

2. Description of the Related Art

Black-liquor soaps are by-products of the Kraft pulping process of pine and other woods. Typically, during the Kraft process, wood chips are digested or cooked for two hours at 170° C. in aqueous liquor containing sodium hydroxide and sodium sulfide. The digestion delignifies the wood chips and gives rise to the production of cellulose pulp, sodium rosin soaps, sodium fatty soaps, lignin degradation products and a series of other chemicals present in the wood. At this conditions, the cellulose is stable and remains in suspension in the black liquor. At the end of the pulping process, the cellulose pulp is separated from the black liquor and washed. The washed pulp can be used as such or be further processed.

The cooking liquor, also known as black liquor must be recovered for both economics and environmental reasons. To this end, the black liquor is typically concentrated by evaporation to a solid content from 23 to 32% in weight, which causes the separation of fatty acid soaps and rosin soaps and also other hydrophobic compounds solubilized in the soaps, that float at the top of the vessel where they are removed or skimmed off. Hence they are called "skimming", a term that will be used as synonymous for black liquor soap or black liquor soap solution in the present invention because the skimming is a concentrated aqueous solution that also has a small amount of filtrable solids.

The skimming contains ordinarily between 30 and 50% of water. The skimming solids are a complex mixture of sodium fatty soaps and sodium rosin soaps, and a series of hydrophobic compounds, such as esters, sterols, stanols, fatty alcohols, waxes, terpenes and small quantities of inorganic salts, such as sodium sulfate and residual black liquor. These hydrophobic compounds of the skimming or black liquor soap solids are known as the unsaponifiable fraction or unsaps. Sometimes these unsaps constitute up to 30% and more of the skimming solids.

The skimming may be used as fuel oil; its calorific value is lower than the half of the fuel oil calorific value. It may be upgraded by transforming into tall oil. This is done by adding sulfuric acid and recovering the oil phase from the aqueous phase. This oil is known as crude tall oil (CTO). Then CTO is exposed to a series of vacuum distillations which produce a light fraction called HEADS, rich in unsaponifiable and fatty acids; fatty acids, TOFA or Tall Oil Fatty Acids, (these are the most valuable product obtainable from CTO); rosin acids or TORA (Tall Oil Rosin Acids); DTO or Distilled Tall Oil, which has many industrial uses and PITCH that is the bottom of the distillation, which is used as fuel or as an ingredient for the preparation of asphalt emulsions. Tall oil distillation processes are widely known in the state of art.

The presence of unsaps in the skimming notably reduces the quality of CTO and its by-products (TORA and TOFA), and it has a repercussion on the final purity of tall oil products which it can normally be detected by a CTO low acid number. A CTO with a high unsap content cannot be economically refined by means of vacuum distillation due to the formation of high proportion (up to 50%) of a low value pitch. Unsap components with a functional alcohol group, such as sterols, stanols, fatty alcohols and others can be combined with fatty acids during acidification of soaps to form esters and thus during CTO washing, drying and storage processes. Most esters have low volatility, which leads to the formation of a high pitch proportion during distillation, which produces a loss of the valuable fatty acids in the TOFA fraction. Unesterified unsap normally have a high volatility and are distilled off with fatty acids, reducing the acid number of TOFA and consequently lowering its value. Therefore, in order to increase the usefulness and value of the CTO and its by-products, it is necessary to refine the skimming to remove or separate the unsaps.

By this means, a wide variety of refining techniques has been developed; their primary objective is to obtain refined soaps to the detriment of the efficient recovery of both quality and quantity of neutral compounds. However, new uses and applications of several components of neutral compounds have lately appeared, notably sterols, stanols, and certain types of fatty alcohol such as docosanol and tetracosanol that can be found in important proportions in the unsaps (Table I). Sterols either free or esterified, have been revealed as important antitumor-like agents and their utilization for that purpose is described in the U.S. Pat. No. 5,270,041. The reduced form of stanols has an important application in the formulation of diets for the reduction of cholesterol plasmatic levels. The use of free stanols for that purpose appears in the U.S. Pat. No. 5,244,887, and the utilization of stanol esters for the same purpose appears in the U.S. Pat. No. 5,502,887.

TABLE 1

Unsaps average composition

| Compound | Weight % |
|---|---|
| 3,5-sitostadiene-3-ona | 0.6 |
| 4-stigmasten-3-ona | 0.5 |
| α-sitosterol | 0.6 |
| β-sitostanol | 7.5 |
| β-sitosterol | 21.0 |
| Campestanol | 0.6 |
| Campesterol | 2.1 |
| Cycloartenol | 0.5 |
| Docosanol | 4.4 |
| Eicosanol | 3.6 |
| Ergosterol | 0.2 |
| Escualene | 1.6 |
| Fatty alcohol esters | 6.1 |
| Sterol esters | 13.7 |
| Hexacosanol | 0.2 |
| Methylencycloartenol | 0.4 |
| Pimaral | 0.7 |
| Pimarol | 2.1 |
| Stigmasta-3-ona | 0.3 |
| Tetracosanol | 2.5 |
| Others | 30.8 |

There is an increasing interest about fatty alcohols, especially docosanol and tetracosanol, due to their notable pharmacological properties as both anti-inflammatory and anti-viral agents. The use of these types of alcohol with pharmacological purposes have been disclosed in many U.S. patents (U.S. Pat. Nos. 4,874,794; 3,031,376; 5,534,554: 5,071,879; and 5,166,219). Therefore, it is supposed that in a near future, the unsaps are going to be considered as primary interest products instead of by-products of black-liquor soap or CTO (crude tall oil) refining. Nevertheless, due to the emphasis of refining methods in soap quality, these methods already known have many disadvantages for the efficient recovery of high-quality unsaponifiables.

Before 1978, a series of black-liquor soap refining methods had been developed, mostly based on the extraction of unsaps by organic solvents. Only U.S. Pat. No. 2,866,739 discloses a different method that consists of steam entraining of sterols and fatty alcohols from the pitch of tall oil distillation at temperatures between 190 and 280° C., followed by vacuum rectification. This method has many defects, such as a thermal and oxidative deterioration of valuable compounds due to the utilization of steam at high temperature, but, above all, this method is incapable of separating the important amount of sterol esters that remain the distillate.

In regard to extracting methods with solvents, it is getting technically harder to fulfill to the increasing environmental restrictions for solvent contents. Therefore, maintaining a process inside the allowed limits of emissions and solvent contents considerably raises the cost of these unsap extracting methods.

As an alternative to unsap extracting methods with liquid solvents, the U.S. Pat. No. 4,422,966 discloses an extracting method of tall oil unsaps through supercritical hydrocarbons, principally ethylene. This method also has difficulties that are inherent in the utilization of solvents and high pressure, which further raises the cost of maintaining ethylene emission levels in the atmosphere within the limits of environmental laws. U.S. Pat. No. 4,076,700 discloses a refining method of skimmings and tall oil soaps. This method consists of feeding these skimmings or tall oil soaps to a thin film evaporator at temperatures between 230 and 310° C. and pressures higher than 1 mmHg. As a first step, water and an unidentified light fraction of unsaps (possibly sterols and free fatty alcohols) are distilled off. Then, dehydrated and partially refined soaps are exposed to an exhaustive saponification that tends to hydrolyze sterol esters and fatty alcohols. The reason for the exhaustive saponification of raw materials is the incapacity of the disclosed method to separate esterified compounds through distillation. However, through the procedure of the present invention described below, it is possible to separate esterified compounds through distillation without saponificating the mixture.

Next, the resulting mixture is acidified and distilled again in a thin film column and fatty acids and isomerized rosin acids are obtained. In a variant of this method, skimmings and tall oil soaps are first exhaustively saponified to hydrolyze sterol esters and then they are exposed to the described process. One of the principal disadvantages of the revealed procedure is its incapability to separate sterol esters through distillation; for this reason, it appeals to the exhaustive saponification at high temperature and pressure. The distillation of both water and unsaps has many problems. In the first place, it represents an enormous load to the vacuum system, which seriously limits its capability of reaching high vacuums. In addition, simultaneous distillation of unsaps and water fractions causes the solidification of the former in the condenser which largely impedes its later recovery. When the saponification occurs in alcoholic solutions, the formation of emulsions that are hard to separate is produced in the condenser and it is necessary to perform later purification stages to obtain such unsaps. In addition, a high water proportion in the distillate impedes a raise of temperature over soap fusion temperature and as a cause of this, soaps adhere to the walls of the column. To relieve this problem, the column has a scraper with a tolerance level of practically 0, which rotates at about 1000 rpm with all the mechanical problems and the excessive energy consumption that this means.

U.S. Pat. No. 4,151,160 discloses a separating method of tall oil unsaps. This method consists of the formation of metallic cation soaps such as zinc and lead, followed by the conventional vacuum distillation at temperatures around 250° C. and pressures over 0.5 mmHg. This method does not allow for separating sterol esters, and the presence of resulting water of the simultaneous neutralization and the distillation of water and unsaps causes the same problems in the vacuum system operation and in the products as described above. The unsap separating methods described in the present invention, correct all the problems that are inherent to the processes known in the state of the art and they provide a high efficient method for obtaining these unsaps.

SUMMARY OF THE INVENTION

The first objective of the present invention is to provide a method for the efficient separation of unsaps from black-liquor soaps or skimmings, including sterol esters and fatty alcohol. This method includes the steps of (1) dehydrating or drying the skimming to a level of humidity not higher than 10% in weight; (2) distilling the dry skimming in a short path distillation column. For this, the dry skimming that is solid at room temperature, is melted at between 150 and 300° C., and is fed to a short path distillation column. Here, the dry and melted skimming is heated at temperatures between 150 and 400° C. The condenser of this column is at temperatures between 50 and 200° C. and the column is at pressures not higher than 0.5 mbar; (3) collecting an essentially soap free distillate; and (4) collecting an essentially neutral compound free residue.

The second objective of the present invention is to provide a method for the efficient separation of unsaps from CTO and its by-products obtained through traditional refining processes of such CTO, for example, the conventional vacuum distillation of CTO in which the fractions TORA, TOFA, DTO, HEADS and PITCH are obtained. This method includes the steps of (1) neutralizing the CTO and/or its by-products with sodium hydroxide, potassium hydroxide or a mixture thereof; (2) dehydrating or drying the CTO and/or some of its neutralized by-products to a level of humidity not higher than 10% in weight; (3) distilling the CTO and/or its neutralized or dry by-products in a short path distillation column. For this, the CTO and/or its neutralized and dry by-products that are solid at room temperature are melted at between 150 and 300° C. and in this condition they are fed to a short path distillation column. Here, this fed product is heated at temperatures between 150 and 400° C. The condenser of this column is at temperatures between 50 and 200° C. and the column is at pressures not higher than 0.5 mbar. (4) collecting an essentially soap free distillate, and (5) collecting an essentially neutral compound free residue.

It is important to note the difference between saponification and neutralization. Saponification is the rupture of ester bonds with simultaneous formation of fatty acid or rosin acid salts from the esters as well as fatty acids or rosin acids that are free in the mixture before saponificating them. However, neutralization is the formation of fatty acid or rosin acid salts that are free in the mixture before the neutralization of the mixture.

Dehydration of skimming or neutralized tall oil before distillation eliminates all the problems that simultaneous distillation of water and unsaps present. The feeding of these dehydrated materials to a molecular distillation system or a short path distillation system allows recovering sterol esters and fatty alcohol. This can not be achieved by the distillation methods already known in the state of the art.

Drying processes widely known in the state of the art can carry out dehydration of skimmings or neutralized CTO. Spray drying and drying through a thin or fine film evaporator at atmospheric or reduced pressure are specially convenient as techniques of water removal, as it is illustrated below through different examples.

As described above, one of the disadvantages of drying with simultaneous removal of neutrals was soap solidification as its water content decreased due to the increment in the fusion temperature of the mixture.

In the present invention, it has been discovered that the addition of unsaponifiables to soap or neutralized tall oil, before drying them in a descendent film evaporator, notably allows reducing the necessary temperature to maintain the mixture at a state of adequate fluidity during the process of drying and at surprisingly low temperatures. Thus, to add about 10% of the neutral compounds allows decreasing the evaporation temperature up to 130° C. at atmospheric pressure.

Adequate unsaponifiable compounds that allow fluidity of soaps at moderate temperatures can be composed of neutrals that are obtained through the procedure described in the present invention. The wax fraction of these neutrals can be used in a more convenient way. Chilean patent application No. 85/1998 discloses the obtaining of these waxes.

Likewise, the removal of a portion of water content from raw materials by centrifuging them can be convenient. Thus, for example, before heat dehydration of the liquor-black soap or neutralized tall oil solution or neutralized tall oil by-products, either alone or mixed with unsaponificable compounds, they can be centrifuged removing a portion of their water content. A tubular or disk centrifuge can carry out this centrifuging process.

Another objective of the present invention is to provide a method for obtaining a sterol concentrate from black-liquor soap solutions or tall oil neutralized or tall oil by-products neutralized. For that, the unsaponifiables obtained, according to the present invention, can be distilled in a molecular distillation column or a short path distillation column. This operation can be repeated until obtaining a current of sterols with the desired purity. The obtaining of a sterol concentrate with a level of purity of 66% to 96% respectively is described in the Examples 9 and 10. This objective can also be achieved by vacuum fractionation in conventional distillation columns as it is shown in the Example 11.

As it is said before, one of the advantages of the present invention is that it allows isolating all the neutral or unsaponificable compounds through distillation, including sterol esters and fatty alcohols. Before the present invention, this was something impossible to achieve through distillation processes described in the state of the art. On the other hand, if wished to obtain free fatty alcohols and sterols from their esters, it is convenient to hydrolyze with potassium hydroxide or sodium hydroxide or a mixture of them, neutral or unsaponifiable substance obtained through the procedure described in the present invention.

The hydrolysis of a neutral fraction obtained through distillation is more efficient than the hydrolysis process on black-liquor soaps because reagents are concentrated on an enriched fraction of about 15% in weight of esters in comparison to 1% in weight of esters present in black-liquor soaps. Typically, unsaponifiables obtained from black-liquor soaps have approximately between 5 and 20% of esters and, through the present invention, they can be distilled off in a molecular distillation column or a short path distillation column. This operation can be repeated until obtaining an ester current with a concentration of up to about 95% in weight, i.e. ester concentration in the current that is going to be hydrolyzed is almost up to 100 times greater than ester concentration in black-liquor soaps. Another advantage of the present invention is the conditions used for hydrolyzing the esters present in the raw materials are very strict; therefore, when the original soap esters are hydrolyzed, valuable fatty acids degrade. However, in the present invention, esters are distilled off, but black-liquor soaps are not exposed to an exhaustive hydrolysis.

An essentially neutral compound free soap fraction is also obtained as a by-product of the disclosed procedure. If wished, these soaps can be acidified to transform them into high-quality tall oil.

In the present invention, the term "essentially soap free neutral compounds" means a neutral compound or a mixture of neutral compounds derived or obtained from black-liquor or tall oil soaps through methods described in the present invention. They contain less than 1% in weight of fatty acid or rosin acid soaps.

The term "essentially neutral free soaps" means a mixture that contains fatty acid and rosin acid soaps obtained from black-liquor or tall oil soaps through the methods described in the present invention. Its neutral compound content is lesser than 20% of the originally black-liquor or tall oil soap neutral compound contents.

Neutral compound or unsaponifiable fraction of black-liquor or tall oil soaps means the compound relative mass obtained from these soaps through the following procedure: As described below, a neutralized black-liquor or tall oil soap sample is dehydrated up to a humidity level not greater than 8%. Then, the dehydrated sample is extracted in a Soxhlet extractor with analytic grade hexane for 48 hours. The hexane extract is desolventized and the desolventized mass equals to 100% of neutral compounds in the dehydrated sample.

Tall oil neutralization is carried out through the following procedure: A tall oil sample is mixed with an equivalent volume of an aqueous NaOH or KOH solution at 20%. The mixture is refluxed for 5 hours. The resulting mixture is neutralized tall oil.

BRIEF DESCRIPTION OF THE DRAWINGS

These and other features, aspects, object and advantages of the present invention will become better understood upon consideration of the following detailed description, appended claims and accompanying drawing where:

Figure 1:
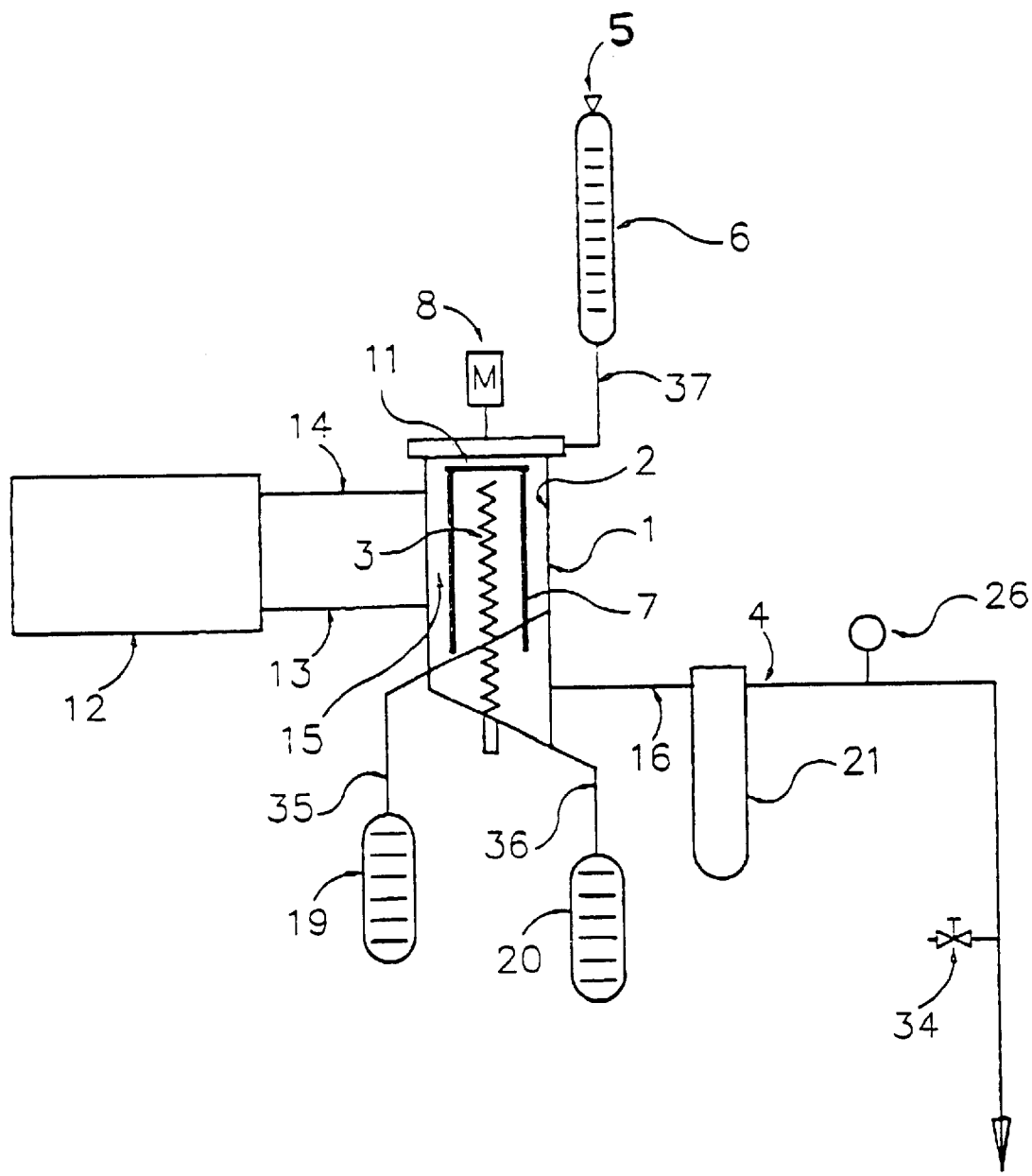
FIG. 1 shows a short path distillation column provided with a scraper-distributor that is used in the present invention.

It should be understood that the drawings are not necessarily to scale and that the embodiments are sometimes illustrated by graphic symbols, phantom lines, diagrammatic representations and fragmentary views. In certain instances, details that are not necessary for understanding the invention or which make other details difficult to perceive may have been omitted. It should be understood, of course, that the invention is not necessarily limited to the particular embodiments illustrated herein.

DETAILED DESCRIPTION OF THE INVENTION

For its purposes, the present invention uses a short path distillation column or a molecular distillation column. At the operational conditions of the present invention it efficiently separates all the neutral compounds from black-liquor soaps or tall oil soaps or soaps derived from tall oil. In a vacuum distillation column, including vacuum film evaporators, the distance to the condensation surface is much longer than the mean free path of molecules to the operation pressure. This adversely affects the efficiency and, at the same time, it represents an enormous load to vacuum production systems; that is why the operation pressure of these devices is normally higher than 1 mbar. So, to separate low volatility compounds, temperature must be arisen, but in many cases it is not possible because the distillate quality is put at risk.

However, in a molecular distillation column, the vacuum way to get the condenser is not obstructed because a short distance or a distance that is slightly longer than the mean free path of distillation molecules separates the condenser from the evaporator. Normally, in a molecular distiller, the mean free path of molecules has a few centimeters. Nevertheless, in order to achieve higher distillation rates, the distance between the evaporation surface and the condensation surface is slightly longer than the distance of the mean free path. In an industrial size molecular distillation column, operation pressures even reach values of 0.001 mbar. Short path distillation columns (evaporation and condensation surfaces are near) are adequate for the purposes of the present invention. When it is said that such surfaces are near, it means that the distance between those surfaces is less than approximately 100 centimeters (it is preferred between approximately 3 and 50 centimeters). The operation system of a short path distillation column is very similar in many aspects to the operation system of a molecular distiller.

Falling film short path distillation columns with or without scraper, flat, rotary or others, short path distillation column-centrifuges, multistage short path distillation columns and others are adequate types of columns for the purposes of the present invention. It is important to point out that when a multistage molecular distillation column is used to separate neutrals, it is possible to obtain more than one neutral distillate current of different compositions.

FIG. 1 shows a short path distillation column provided with a scraper-distributor that is used in the present invention (available from UIC Inc.). Others short path distillation columns can also be used. FIG. 1 shows a short path distillation column 1 with an evaporation surface 2 located near to a hollow internal condenser 3 in which a thermal fluid flows. The source of this heat transference fluid is not shown. The raw material 5 is fed from the top to a double wall graduated feeder 6 that allows recirculation of a heat transference fluid, which maintains the raw material in liquid state. The heating fluid source is not shown. The raw material 5 flows from the feeder 6 to the column 1 through the heated line 37 through the recirculation of a thermal fluid (not shown) and it runs down to the evaporator surface 2 and a revolving scraper distributor 7 spreads the raw material 5 on the surface 2. A motor 8 provided with a speed control device that is near to the top of the evaporator 1 makes the axis and the revolving scraper distributor rotate 11. The combined effect of gravity and the revolving scraper distributor 7 allows a thin and uniform layer to cover the evaporator surface 2. The thin layer is heated on the evaporator surface by circulating a heat transference fluid through the column jacket 1. The heat transfer fluid is heated in the source 12 and enters via line 13 and exits via line 14 of the column jacket 1. Heat transfer fluid temperature in the column jacket 1 is generally 50° C. higher than heat transference fluid temperature in the inner condenser 3 of the column 1. An adequate heat transfer fluid could be water, pressure water, steam, ethylene glycol, oil, special or similar thermal fluids.

The space 15 between the evaporator surface 2 and the inner condenser 3 is evacuated by vacuum line way 16 connected to a double wall cold trap 21. Inside of it, there is a cooling medium (liquid air or dry ice with isopropanol, for example). The combination of vacuum and heat allows volatile components to escape from the thin layer, to travel through space 15, and to condense on the inner condenser 3. More volatile components are retained in the cold trap. The distillate that is not shown flows down on the evaporator surface 2 as a thin layer and arrives the flask 19 heated line way 35 through a thermal fluid recirculation that does not appear in the figure. The distillate flows down through the outer surface of the inner condenser 3 and it gets to the flask 20 heated line way 36 through a thermal fluid recirculation that does not appear in the figure. A rotary vane vacuum pump (not shown) provided with an exhaust gas filter and connected to the cold trap 21 at exit 4 produces vacuum in the space 15. A pressure sensor 26 sends an electric signal to a pressure meter, which indicates the pressure in the space 15. A micrometric valve 34 located at the entry of the vacuum pump allows regulating pressure by the controlled entrance of air, inert gas or nitrogen. Column 1 and its accessories are fixed to a metallic bearing over a base. An electric panel (not shown) contains the connections for the pressure sensor, the motor, the diffusion pump, the vacuum rotary pump and the baths for the heat transference fluids.

The present invention is further illustrated in the following Examples, which are intended as exemplifying the invention and are not intended to be taken as limiting.

EXAMPLE 1

Drying of Black-liquor Soap in a Spray Dryer 590 kgr. of black-liquor soap with a water content of 33.7% in weight and 12.4% in weight of unsaponifiables or neutrals were mixed with 276 kgr. of soft water in a feeding container of a NIRO spray dryer. Then, the mixture was homogenized and heated at 50° C.

The temperature of entrance combustion gas current was adjusted to 200–220° C. and black-liquor soap solution was fed to an average flow of 192 kgr/hr. The temperature of exit gas and steam mixture fluctuated between 107 and 114° C., resulting in a current of 87 kgr/hr of dry black-liquor soap with an average humidity of 1.0% in a dry basis and with an unsaponifiable percentage of 18.7% on a dry soap basis. The drying operation was carried out at atmospheric pressure.

EXAMPLE 2

Centrifuging and Drying of Black-liquor Soap in a Thin Film Evaporator 100 kgr. of black-liquor soap with a water content of 33.2% in weight was weighed and centrifuged at 10000 rpm for 30 minutes. Light phase that contained around 27.3% in water weight was recovered and was fed at 7kgr/hr in a thin film evaporator with a heat transference surface of 0.15 m². This evaporator is provided with scraping knives that rotate separated from the inner wall of the thin film evaporator at 0.5 mm of distance and 1000 rpm of speed. Black-liquor soap was fed at 50° C. and it gets in contact with the thin film evaporator surface that is at a temperature of 210° C. and the column at a pressure of 500 mbar. Black-liquor soap leaving from the thin film evaporator had an average humidity of 1.0% in weight.

EXAMPLE 3

Drying of Black-liquor Soap Mixed with Unsaponifiables in a Thin Film Evaporator 100 kgr of black-liquor soap with a water content of 33.2% in weight were weighed and mixed with 10 kgr of unsaponifiables obtained as it is described in Example 5. Then, they were fed 5 at kgr/hr in a thin film evaporator with a heat transfer surface of 0.15,m² provided with scraping knifes that rotate separated from the inner wall of the thin film evaporator at 0.5 mm of distance and at 1000 rpm of speed. The mixture of black-liquor soap and unsaponifiables was fed at 50° C. and it gets in contact with the thin film evaporator surface that is at a temperature of 150° C. and the column at a pressure of 200 mbar. The dehydrated mixture flew off from the thin film evaporator with an average humidity level of 1.0% in weight.

EXAMPLE 4

Neutralization of Tall Oil with Sodium Hydroxide 100 gr. of melted CTO at 75° C. with a content of 17.0% in weight of unsaponifiables were gradually poured in a 250 ml flask provided with stirring device and reflux condenser. This contained 60 gr. of an aqueous solution of sodium hydroxide at 25.0% in weight maintained at 90° C. The resulting mixture was maintained under reflux for 5 hours.

25 gr. of the mixture were taken and extracted four times with 60 ml of hexane. The hexane extract was centrifuged at 4000 rpm and was desolventized in a rotary vaporator at reduced pressure. 1 gr. of the residue was weighed and its acid number was 1.5.

EXAMPLE 5

Distillation of Black-liquor Soap in a Short Path Distillation Column 10 gr. of black-liquor soap were weighed in a 100-ml beaker and they were dried in an oven at 125° C. for 5 hours, determining a humidity percentage of 33.7%. Then, 25 gr. of dry black-liquor soap were extracted for 48 hours in a Soxhiet extractor with 200 ml of hexane. The hexane extract was desolventized and 4.7 gr. of unsaponifiable mass were recovered.

At the same way, 10 gr. of black-liquor soap were weighed and then they were mixed with 50 gr. of water. They were acidulated with 2 ml of concentrated sulfuric acid. Centrifuging the mixture at 4000 rpm separated the oily phase that was formed. The organic phase once washed had an acid number of 152.

500 kgr of black-liquor soap were dried as it was described in Example 1 to a humidity of 1.0% in weight. 500 gr. of dry black-liquor soap were melted at 200° C. and they were loaded at the entrance 5 of the device feeder 6 (FIG. 1). Feeder temperature was maintained at 210° C. through thermal oil circulation. Condenser 3 temperature remained at 80° C. through a HAAKE thermostated bath. Distillation column jacket temperature was heated at 300° C. through thermal oil circulation provided from the heating bath 12 (FIG. 1). Castrol HT-5 was used as thermal oil.

Distillation column pressure remained at 0.009 mbar through a Leybold Heraeus vacuum pump, model Trivac, type D2A/WS provided with a diffusion pump. The rollers rotated at 150 rpm and the average feeding was of 1.5 ml/min. After processing raw materials, 411.7 gr. of the residue and 83.3 gr. of the distillate were recovered. The percentage of unsaponifiable of refined black-liquor soap or residue was of about 2.2% in weight. At the same way, 10 gr. of the residue were weighed, mixed with 50 gr. of water and acidulated with 2 ml of concentrated sulfuric acid. Centrifuging the mixture at 4000 rpm separated the oily phase that was formed. The organic phase was washed and its acid number was 182.

25 gr. of the distillate were weighed, dissolved with 250 gr. of hexane and extracted three times with 30 gr. of an aqueous solution of ethanol at 50% in weight neutralized at pH 7. The aqueous extract was titrated with sulfuric acid 0.01 N in an automatic titrator. The free alkalinity was of 0.4 mgr. of sulfuric acid per distillate gram.

The distillate was analyzed chromatographically, as it is described in the procedure below. Table 2 shows the relative composition of distillate components.

TABLE 2

Distillate composition in Example 5

| Compound | % in weight |
| --- | --- |
| 3,5-sitostadiene-3-ona | 0.4 |
| 4-stigmasten-3-ona | 0.3 |
| α-sitosterol | 0.1 |
| β-sitostanol | 7.9 |
| β-sitosterol | 21.8 |
| Campestanol | 0.9 |
| Campesterol | 1.7 |
| Cycloartenol | 0.7 |
| Docosanol | 4.4 |
| Eicosanol | 3.5 |
| Ergosterol | 0.1 |
| Escualeno | 1.4 |
| Fatty alcohol esters | 6.3 |
| Sterol esters | 14.1 |
| Hexacosanol | 0.2 |
| Methylencycloartenol | 0.3 |
| Pimaral | 0.8 |
| Pimarol | 2.2 |
| Stigmasta-3-ona | 0.2 |
| Tetracosanol | 2.8 |
| Others | 29.9 |

EXAMPLE 6

Hydrolysis of Unsaponifiables 10 gr. of the distillate of Example 5 were weighed and mixed with 40 gr. of an aqueous solution of KOH at 15% and 40 gr. of toluene. Then they were loaded to a PARR pressure reactor, model 4522. Here, they reacted under agitation at 254° C. and 59 bar for 3 hours. Once the reactor content cooled down, the mixture was poured in a separator, recovering the organic phase. This phase was washed with 25 ml of an aqueous ethanol solution 1:1 in volume. This operation was repeated until the resulting aqueous solution of the organic phase washing had a neutral pH. The separated organic phase was desolventized. The recovered solids weighed 9.3 gr. and the analysis of their composition showed 42.0% of free sterols and 14.6% of free fatty alcohol; this means a rise of sterols of almost 20% and fatty alcohols, 25%.

EXAMPLE 7

Distillation of Neutralized tall Oil in a Short Path Distillation Column 10 gr. of neutralized tall oil (initial acid number 141) obtained as it is described in Example 4 were weighed in a 100-ml beaker and dried in an oven at 125° C. for 5 hours, determining a humidity percentage of 30.1% in weight. Then, 25 gr. of neutralized and dry tall oil were extracted for 48 hours in a Soxhlet extractor with 200 ml of hexane. The hexane extract was desolventized and 4.9 gr. of the unsaponifiable mass were recovered.

500 kgr. of neutralized tall oil previously analyzed were dried as it is described in Example 2 to a humidity of 1.0% in weight.

500 gr. of neutralized and dry tall oil were melted at 220° C. and they were loaded at the entrance 5 of the equipment feeder 6 shown in FIG. 1. Feeder temperature was maintained at 230° C. through circulation of thermal oil. Condenser temperature 3 remained at 80° C. through a HAAKE thermostated bath. Distillation column jacket temperature was heated at 320° C. through circulation of thermal oil provided from the heating bath 12 in FIG. 1. Castrol HT-5 was used as thermal oil.

Equipment pressure was maintained at 0.07 mbar through a Leybold Heraeus vacuum pump, model Trivac, type D2A/WS provided with a diffusion pump. Rollers rotated at 150 rpm and the average feeding was 1.5 ml/min.

After processing the whole load, 385.4 gr. of the residue was recovered and an unsaponifiable percentage of 1.8% in weight was determined through extraction with Soxhlet. At the same way, 10 gr. of the residue were weighed, mixed with 50 gr. of water and acidified with 2 ml of concentrated sulfuric acid. Centrifuging the mixture at 4000 rpm separated the oily phase that was formed. The organic phase was washed and its acid number was 174.

89.2 gr. of the distillate were recovered from which 25 gr. were weighed, dissolved with 250 gr. of hexane and extracted three times with 30 gr. of an aqueous solution of ethanol at 50% in weight that was neutralized at pH 7. The aqueous extract was titrated with sulfuric acid 0.01 N in an automatic titrator. The free alkalinity was of 0.3 mgr. of sulfuric acid per distillate gram. Table 3 shows the relative composition of the compounds.

TABLE 3

Distillate composition in Example 7

| Compound | % in weight |
| --- | --- |
| 3,5-sitostadiene-3-ona | 0.6 |
| 4-stigmasten-3-ona | 0.2 |
| α-sitosterol | 0.4 |
| β-sitostanol | 6.7 |
| β-sitosterol | 18.5 |
| campestanol | 1.1 |
| Campesterol | 2.0 |
| Cycloartenol | 0.4 |
| Docosanol | 4.0 |
| Eicosanol | 3.3 |
| Ergosterol | 0.0 |
| Escualeno | 1.2 |
| Fatty alcohol esters | 6.5 |
| Sterol esters | 14.7 |
| Hexacosanol | 0.2 |
| Methylencycloartenol | 0.2 |
| Pimaral | 0.7 |
| Pimarol | 2.0 |
| Stigmasta-3-ona | 0.3 |
| Tetracosanol | 3.1 |
| Others | 33.9 |

EXAMPLE 8

Distillation of Tall Oil Pitch 150 gr. of melted tall oil pitch, with an acid number of 108.1, were gradually poured at 155° C. in a 250 ml flask provided with a stirring device and reflux condenser that contained 55 gr. of an aqueous solution of sodium hydroxide at 25% in weight maintained at 90° C. The resulting mixture was maintained at reflux for five hours.

50 gr. of the mixture were extracted four times with 80 ml of hexane. The hexane extract was centrifuged at 4000 rpm and desolventized in a rotary evaporator at reduced pressure. 1.0 gr. of the residue was weighed and its acid number was 1.8.

10 gr. of neutralized tall oil pitch were weighed in a 100-ml beaker and they were dried in an oven at 125° C. for 5 hours, determining a humidity percentage of 22.1% in weight. Then, 25 gr. of the neutralized and dry tall oil pitch were extracted for 48 hours in a Soxhlet extractor with 200 ml of hexane. The hexane extract was desolventized and 10.4 gr. of unsaponifiable mass were recovered.

500 kgr of the analyzed tall oil pitch were dried to a humidity of 1.0% in weight, according to the described procedure in Example 2.

500 gr. of neutralized and dry tall oil were melted at 220° C. and they were loaded at the entrance 5 of the equipment feeder 6 shown in FIG. 1. Feeder temperature was maintained at 230° C. through circulation of thermal oil. Condenser temperature 3 remained at 80° C. through a HAAKE thermostated bath. Distillation column jacket temperature was heated at 320° C. through circulation of thermal oil provided from the heating bath 12 in FIG. 1. Castrol HT-5 was used as thermal oil.

Equipment pressure was maintained at 0.07 mbar through a Leybold Heraeus vacuum pump, model Trivac, type D2A/WS provided with a diffusion pump. Rollers rotated at 150 rpm and the average feeding was 1.5 ml/min.

After processing raw materials, 305.6 gr. of the residue was recovered and an unsaponifiable percentage of 4.7% in weight was determined through extraction with Soxhlet. At the same way, 10 gr. of the residue were weighed, mixed with 50 gr. of water and acidified with 2 ml of concentrated sulfuric acid. Centrifuging the mixture at 4000 rpm separated the oily phase. The organic phase was washed and its acid number was 175.8.

194.3 gr. of the distillate were recovered from which 25 gr. were weighed, dissolved with 250 gr. of hexane and extracted three times with 30 gr. of an aqueous solution of ethanol at 50% in weight that was neutralized at pH 7. The aqueous extract was titrated with sulfuric acid 0.01 N in an automatic titrator. The free alkalinity was of 0.2 mgr. of sulfuric acid per distillate gram.

EXAMPLE 9

Unsaponifiable Fractionation in Short Path Distillation Column 500 gr. of distillate produced according to Example 7 were weighed, melted at 100° C. and loaded to the feeder of the short path distillation device shown in FIG. 1. Feeder temperature was maintained at 100° C. through circulation of thermal oil. Condenser temperature 3 remained at 70° C. through a HAAKE thermostat bath. Distillation column jacket temperature was heated at 140° C. through circulation of thermal oil provided from the heating bath 12 in FIG. 1. Castrol HT-5 was used as thermal oil.

Equipment pressure was maintained at 0.05 mbar through a Leybold Heraeus vacuum pump, model Trivac, type D2A/WS provided with a diffusion pump. Rollers rotated at 150 rpm and the average feeding was 3.0 ml/min.

215.5 gr. of the distillate, mainly composed by fatty alcohols, were recovered. Sterol percentage in the distillate current was of 3.9% in weight. Table 4 shows the relative composition of fatty types of alcohol in the condensing:

TABLE 4

Relative purity of fatty alcohol

| Compound | % Relative |
|---|---|
| Eicosanol | 6.2 |
| Docosanol | 51.4 |
| Tetracosanol | 30.7 |
| Hexacosanol | 1.5 |
| others | 10.2 |

Distillation bottom was collected and loaded again in the feeder of the short path distillation column. Feeder temperature was maintained at 140° C. through circulation of thermal oil. Condenser temperature 3 remained at 130° C. through a HAAKE thermostat bath. Distillation column jacket temperature was heated at 230° C. through circulation of thermal oil provided from the heating bath 12 in FIG. 1. Castrol HT-5 was used as thermal oil.

Equipment pressure was maintained at 0.05 mbar through a Leybold Heraeus vacuum pump, model Trivac, type D2A/WS provided with a diffusion pump. Rollers rotated at 150 rpm and the average feeding was 3.0 ml/min.

203.2 gr. of distillate with a sterol content of 66.1% in weight were recovered. Table 5 shows the relative composition of sterols:

TABLE 5

Relative purity of sterols

| Compound | % Relative |
|---|---|
| β-Sitosterol | 74.6 |
| β-Sitostanol | 23.1 |
| Campesterol | 2.1 |
| others | 0.2 |

EXAMPLE 10

Obtaining of a High Purity Sterol Concentrate 100 gr. of distillate produced according to Example 9, which contained 66.1% in weight of sterols, were weighed, melted at 120° C. and loaded to the feeder of the short path distillation device shown in FIG. 1. Feeder temperature was maintained at 120° C. through circulation of thermal oil. Condenser temperature 3 remained at 50° C. through a HAAKE thermostat bath. Distillation column jacket temperature was heated at 120° C. through circulation of thermal oil provided from the heating bath 12 in FIG. 1. Castrol HT-5 was used as thermal oil.

Equipment pressure was maintained at 0.1 mbar through a Leybold Heraeus vacuum pump, model Trivac, type D2A/WS provided with a diffusion pump. Rollers rotated at 150 rpm and the average feeding was 3.0 ml/min.

66.0 gr. of the residue with a sterol content of 90.2% in weight were recovered and loaded again in the feeder of the short path distillation column. Feeder temperature was maintained at 150° C. through circulation of thermal oil. Condenser temperature 3 remained at 130° C. through a HAAKE thermostat bath. Distillation column jacket temperature was heated at 245° C. through circulation of thermal oil provided from the heating 12 in FIG. 1. Castrol HT-5 was used as thermal oil.

Equipment pressure was maintained at 0.05 mbar through a Leybold Heraeus vacuum pump, model Trivac, type D2A/WS provided with a diffusion pump. Rollers rotated at 150 rpm and the average feeding was 3.0 ml/min.

57.4 gr. of distillate with a sterol content of 96.1% in weight were recovered. Table 6 shows the relative composition of sterols:

TABLE 6

Relative purity of sterols

| Compound | % Relative |
|---|---|
| β-Sitosterol | 72.1 |
| β-Sitostanol | 24.2 |
| Campesterol | 2.5 |
| Others | 1.2 |

EXAMPLE 11

Fractionation of Unsaponificables in a Vigreux Column

.33.6 gr. of distillate produced according Example 7 were weighed in a 500-ml flask provided with a thermometer helder that controls the bottom temperature connected to a vigreux column, claisen, condenser, elbow and collector that are united to a Leybold Heraeus vacuum pump, model Trivac, type D2A/WS provided with a diffusion pump.

Distillation was carried out at a constant pressure of 0.1 mbar. Table 7 shows the at different temperatures:

TABLE 7

Fractions of distillate of Test 11

| Distillate fraction | Bottom ° C. | Top ° C. | Distillate mass (gr.) | Sterol % in weight |
|---|---|---|---|---|
| 1 | 209 | 169 | 136.6 | 2.34 |
| 2 | 243 | 202 | 56.4 | 29.30 |
| 3 | 265 | 215 | 34.9 | 58.3 |
| 4 | 288 | 218 | 1.9 | 82.3 |
| 5 | 330 | 236 | 77.9 | 53.4 |
| Residue | — | — | 23.6 | 12.6 |

Description of the Analysis

Chromatographic Analysis of the Unsaponifiable Substance

The identification of the unsaponifiable substance components and the unsaponifiable substance fractions obtained according to the procedure of the present invention was carried out through a gaseous capillary chromatography. The chromatographic method used is the result of an extensive survey about the more convenient conditions and techniques for determining the different components in the unsaponifiable substance and its distilled fractions.

a) Chromatographic Operation Parameters

| | |
|---|---|
| Hewlett Packard chromatographer, model HP 5890, series 2, capillary column HP-5, 30 m long, 0.32 mm diameter, 0.25 mm film | |
| Furnace temperature | 300° C. (isotherm) |
| Injector temperature | 320° C. |

| Hewlett Packard chromatographer, model HP 5890, series 2, capillary column HP-5, 30 m long, 0.32 mm diameter, 0.25 mm film | |
|---|---|
| Detector temperature | 320° C. |
| Carrier flux (He) | 0.92 ml/min |
| Split | 60:1 |
| Program | 15 min |
| Injection | 0.5 µl | b) Sample Preparation

Accurately weigh 0.1 mgr., 100 mgr. of sample
Dissolve in 25 ml of tetrahydrofurane (THF)
Add 500 µl of this solution in a silanization vial
At the same time, precisely weigh 0.1 mgr., 50 mgr. of 5β-colestan-3α-ol
Dissolve in 100 ml of n-propanol
Add in the tube 500 µl of the 5 β-colestan-3α-ol solution
Dry under nitrogen atmosphere
Add 300 µl of Bis (trimethylsilyl) trifluoroacetamide (BSTFA)
Add 300 µl of pyridine
Maintain the solution at 70° C. for 10 minutes
Dry under inert atmosphere
Dissolve with 500 µl of THF
Note: The reagents must have an analytic grade.

c) Calculations

Record the area of the compound of interest
Record the area of 5β-colestan-3 α-ol
Calculate the weight percentage of the compound of interest through the following formula:

$$\% X = \frac{A_x \cdot M_p}{A_p \cdot M_m} \cdot 100$$

Where,
  X: percentage in weight of the compound of interest
  $A_x$: chromatographic area of the compound of interest
  $M_p$: pattern added mass (5β-colestan-3α-ol)
  $A_p$: pattern chromatographic area (5β-colestan-3 α-ol)
  $M_m$: sample added mass Although the invention has been described in considerable detail with reference to certain preferred versions, one skilled in the art will appreciate that the present invention can be practiced by other than the preferred versions, which have been presented for the purpose of illustration and not of limitation. Therefore, the spirit and scope of the appended claims should not be limited to the description of the preferred versions provided herein.

What is claimed is:

1. A method for obtaining neutral compounds of tall oil pitch comprising the following steps:
   neutralizing tall oil pitch with an aqueous solution of sodium hydroxide, potassium hydroxide or a mixture thereof to form a neutralized solution;
   dehydrating the neutralized solution to form a dehydrated current;
   feeding the dehydrated current to a distillation column selected from the group consisting of molecular distillation columns and short path distillation columns;
   distilling the dehydrated current in the distillation column;
   collecting a distillate current including the neutral compounds from the distillation column; and
   collecting a residue current from the distillation column.

2. The method of claim 1 characterized in that the step of dehydrating the neutralized solution to form the dehydrated current comprises:
   feeding the neutralized solution to a spray dryer;
   contacting the neutralized solution to a hot gas current at temperatures between 150 and 250° C.; and
   collecting the dehydrated current.

3. The method of claim 1 characterized in that the step of dehydrating the neutralized solution to form the dehydrated current comprises:
   feeding the neutralized solution to a falling film evaporator; and
   collecting the dehydrated current,
   wherein the temperature of an evaporation surface of the evaporator is between 100 and 250° C. and the pressure of the evaporator is between 100 and 1000 mbar.

4. The method of claim 1 characterized in that the step of dehydrating the neutralized solution to form the dehydrated current comprises:
   centrifuging the neutralized solution;
   collecting a light phase resulting from the centrifuging;
   feeding the light phase to a spray dryer wherein the light phase contacts a hot gas current at temperatures between 150 and 250° C.; and
   collecting the dehydrated current.

5. The method of claim 1 characterized in that the step of dehydrating the neutralized solution to form the dehydrated current comprises:
   centrifuging the neutralized solution;
   collecting a light phase resulting from centrifuging;
   feeding the light phase to a falling film evaporator, wherein the temperature of an evaporation surface of the evaporator is between 100 and 250° C. and the pressure of the evaporator is between 100 and 1000 mbar; and
   collecting the dehydrated current.

6. The method of claim 1 characterized in that the step of dehydrating the neutralized solution to form the dehydrated current comprises:
   mixing the neutralized solution with one or more unsaponifiable fractions of black liquor soaps to form a mixture;
   centrifuging the mixture;
   collecting a light phase of the centrifugation;
   feeding the light phase to a falling film evaporator, wherein the temperature of an evaporation surface of the evaporator is between 100 and 250° C. and the pressure of the evaporator is between 100 and 1000 mbar; and
   collecting the dehydrated current.

7. The method of claim 1 characterized in that the step of dehydrating the neutralized solution to form the dehydrated current comprises:
   centrifuging the neutralized solution;
   collecting a light phase of the centrifugation;
   mixing the light phase with one or more unsaponifiable fractions of black liquor soaps;
   feeding the light phase to a falling film evaporator, wherein the temperature of an evaporation surface of the evaporator is between 100 and 250° C. and the pressure of the evaporator is between 100 and 1000 mbar; and collecting the dehydrated current.

8. The method of claim 1 characterized in that the step of dehydrating the neutralized solution to form the dehydrated current comprises:

mixing the neutralized solution with one or more unsaponifiable fractions of black liquor soaps to form a mixture;

feeding the mixture to a falling film evaporator, wherein the temperature of an evaporation surface of the evaporator is between 100 and 250° C. and the pressure of the evaporator is between 100 and 1000 mbar; and collecting the dehydrated current.

9. The method of claim 1 further including the steps of:

mixing the distillate current with an aqueous solution of an alkali hydroxide to form a distillate solution;

heating the distillate solution at a temperature between 100 and 300° C. for at least 15 minutes;

separating a non-aqueous phase from the distillate solution; and collecting the non-aqueous phase.

10. The method of claim 9 further including the step of:

feeding the non-aqueous phase to a distillation column selected from the group consisting of molecular distillation columns and short path distillation columns, wherein the distillation column includes a vertical surface of heated evaporation, a revolving scraper and an inner condenser located at less than 100 centimeters from the vertical surface wherein the non-aqueous phase is fed on the vertical surface and spread on the vertical surface as a thin layer while it is heated, a second distillate current is collected from the inner condenser, a second residue current is collected from a bottom portion of the distillation column, the vertical surface is heated at temperatures between 50 and 200° C. and the pressure is not higher than approximately 0.5 mbar.

11. The method of claim 1 further including the steps of:

feeding the distillate current to a fractionation column having a reboiler and a condenser, the reboiler and the condenser operating at a pressure less than 1 mbar; and collecting one or more secondary distillate currents.

12. The method of claim 1 characterized in that:

the distillation column includes a vertical surface of heated evaporation, a revolving scraper and an inner condenser located less than 100 centimeters from the vertical surface wherein the dehydrated current is fed on the vertical surface and spread on the vertical surface as a thin layer while the dehydrated current is heated, the distillate current is collected from the inner condenser, the residue current is collected from a bottom portion of the distillation column, the vertical surface is heated at temperatures between 150 and 400° C., and the pressure is not higher than approximately 0.5 mbar.

13. The method of claim 12 further including the steps of:

feeding the distillate current to a distillation column selected from the group consisting of molecular distillation columns and short path distillation columns, the distillation column including a vertical surface of heated evaporation, a revolving scraper and an inner condenser located less than 100 centimeters from the vertical surface wherein the distillate current is fed on the vertical surface and spread on the vertical surface as a thin layer while the distillate current is heated, a second distillate current is collected from the inner condenser, a second residue current is collected from a bottom portion of the distillation column, the vertical surface is heated at temperatures between 50 and 250° C., and the pressure is not higher than approximately 0.5 mbar.

14. The method of claim 13 further including the steps of:

feeding the second distillate current to a distillation column selected from the group consisting of molecular distillation columns and short path distillation columns, the distillation column including a vertical surface of heated evaporation, a revolving scraper and an inner condenser located less than 100 centimeters from the vertical surface wherein the second distillate current is fed on the vertical surface and spread on the vertical surface as a thin layer while the second distillate current is heated, a third distillate current is collected from the inner condenser, a third residue current is collected from a bottom portion of the distillation column, the vertical surface is heated at temperatures between 100 and 250° C., and the pressure is not higher than approximately 0.5 mbar.

15. The method of claim 14 wherein the third distillate current contains not less than 60% of sterols.

16. The method of claim 14 further including the steps of:

feeding the third distillate current to a distillation column selected from the group consisting of molecular distillation columns and short path distillation columns, the distillation column including a vertical surface of heated evaporation, a revolving scraper and an inner condenser located less than 100 centimeters from the vertical surface wherein the third distillate current is fed on the vertical surface and spread on the vertical surface as a thin layer while the third distillate current is heated, a fourth distillate current is collected from the inner condenser, a fourth residue current is collected from a bottom portion of the distillation column, the vertical surface is heated at temperatures between 50 and 200° C., and the pressure is not higher than approximately 0.5 mbar.

17. The method of claim 16 wherein the fourth distillate current contains not less than 80% of sterols.

* * * * *